US010171723B2

(12) United States Patent
Ulichney et al.

(10) Patent No.: US 10,171,723 B2
(45) Date of Patent: Jan. 1, 2019

(54) FREQUENCY DOMAIN RANGE DETERMINATION FOR A PERIODIC OR QUASI-PERIODIC TARGET

(71) Applicant: Hewlett-Packard Development Company, L.P., Houston, TX (US)

(72) Inventors: Robert Ulichney, Stow, MA (US); Matthew D Gaubatz, Seattle, WA (US); Stephen Pollard, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 33 days.

(21) Appl. No.: 15/327,290

(22) PCT Filed: Jul. 18, 2014

(86) PCT No.: PCT/US2014/047241
§ 371 (c)(1),
(2) Date: Jan. 18, 2017

(87) PCT Pub. No.: WO2016/010560
PCT Pub. Date: Jan. 21, 2016

(65) Prior Publication Data
US 2017/0163874 A1    Jun. 8, 2017

(51) Int. Cl.
*H04N 5/232*  (2006.01)
*G02B 7/36*  (2006.01)
*G01S 13/08*  (2006.01)
*G01S 11/12*  (2006.01)
*G03B 13/20*  (2006.01)

(52) U.S. Cl.
CPC .......... *H04N 5/23212* (2013.01); *G01S 11/12* (2013.01); *G01S 13/08* (2013.01); *G02B 7/365* (2013.01); *G03B 13/20* (2013.01)

(58) Field of Classification Search
CPC ...... H04N 5/23212; G01S 13/08; G03B 13/20
USPC ............................................................ 348/348
See application file for complete search history.

(56) References Cited

U.S. PATENT DOCUMENTS

| 5,544,252 | A | 8/1996 | Iwaki et al. |
| 5,692,072 | A | 11/1997 | Hashimoto |
| 6,088,488 | A | 7/2000 | Hardy et al. |
| 8,102,464 | B2 | 1/2012 | Liaw |
| 8,245,936 | B2 | 8/2012 | Thuries et al. |
| 2003/0223002 | A1* | 12/2003 | Minami ............. H04N 5/23203 348/275 |
| 2006/0126019 | A1 | 6/2006 | Liang et al. |
| 2009/0277962 | A1 | 11/2009 | McCloskey |
| 2011/0267477 | A1 | 11/2011 | Kane et al. |
| 2013/0170765 | A1 | 7/2013 | Santos |

OTHER PUBLICATIONS

Safran, M.I. "A computer vision based barcode reading system", Aug. 2008.

* cited by examiner

*Primary Examiner* — Lin Ye
*Assistant Examiner* — Chan T Nguyen
(74) *Attorney, Agent, or Firm* — HP Inc. Patent Department

(57) ABSTRACT

Examples disclosed herein relate to determining peak distances between an origin, point in the frequency domain and peak points of a discrete Fourier transform magnitude of an image of a periodic or quasi-periodic target. In some implementations, a range distance between the target and the imaging lens is determined based on the peak distances.

8 Claims, 10 Drawing Sheets

Spatial domain

Frequency domain

Spatial domain

Frequency domain

Spatial domain

Frequency domain

FREQUENCY DOMAIN RANGE DETERMINATION FOR A PERIODIC OR QUASI-PERIODIC TARGET

BACKGROUND

Conventional methods of automatically determining the distance to a target uses special hardware. For example, a laser source can be used to send a pulse of light toward a target, and a specialized optical recovery system measures the transit time for the laser pulse to be reflected back from the target.

BRIEF DESCRIPTION OF THE DRAWINGS

The accompanying drawings illustrate various examples of the principles described below. The examples and drawings are illustrative rather than limiting.

DETAILED DESCRIPTION

Automatically determining the distance to, a target can involve costly equipment. However, the techniques presented below use an imaging system and a processor, such as can be found in a mobile device like a smartphone, to perform range-finding for both, the near field and far field. A periodic or quasi-periodic target is imaged by the imaging system, and the processor performs a discrete Fourier transform (DFT) on the image of the target. Both the range distance and the autofocus distance are dependent on the locations of the peaks of the magnitude of the DFT relative to the origin of the frequency domain. Expressions are presented for the range distance between the imaging system and the target and the autofocus distance between an imaging lens of the imaging system and a sensor that captures the image. In some implementations, a system can serve a dual purpose of finding the range distance and recovering embedded data in a quasi-periodic target.

Figure 1:
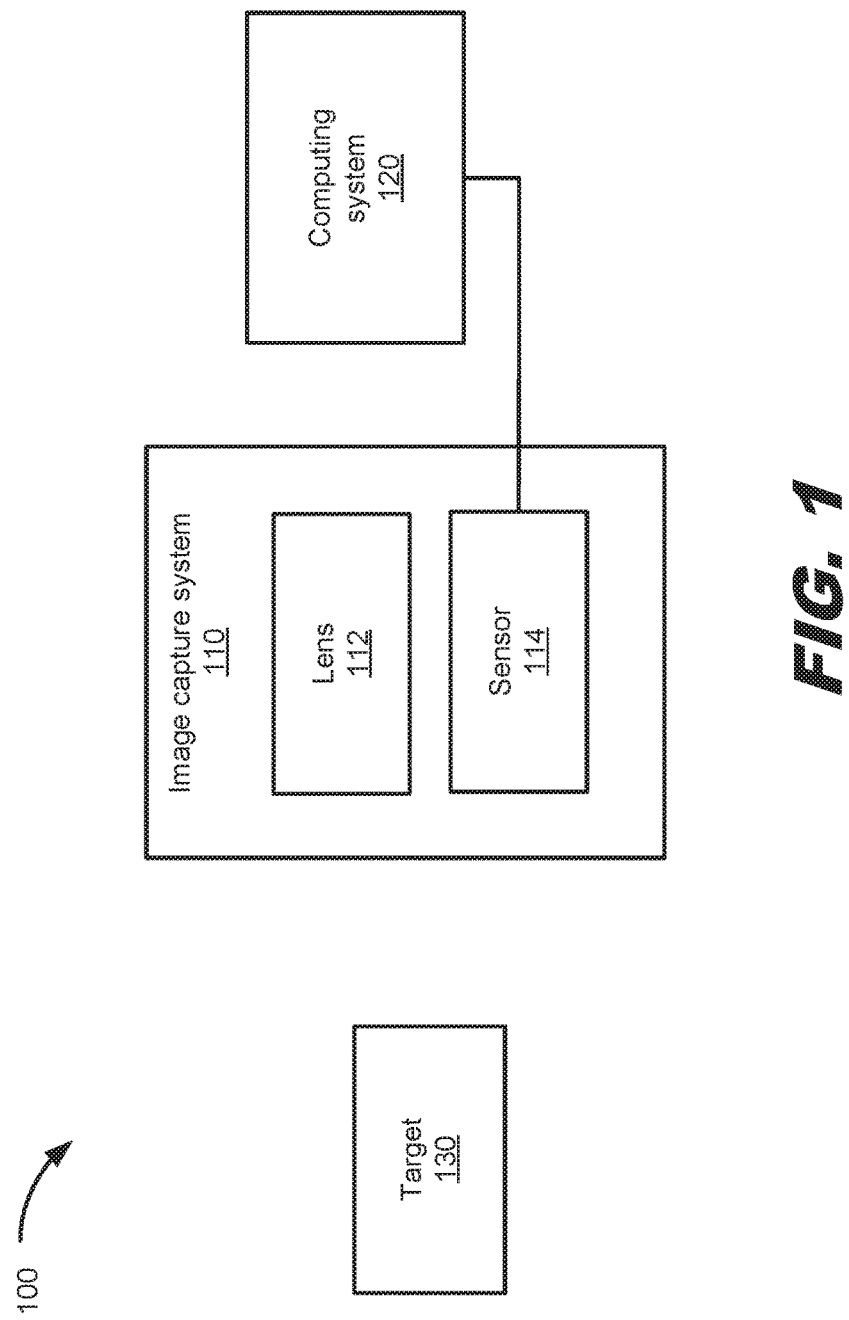
FIG. 1 depicts an example environment in which a computing system that performs range finding and autofocusing may be implemented.

FIG. 1 depicts an example environment 100 in which a computing system 120 that can perform range finding and autofocusing functions may be implemented. An imaging system 110 can include a lens 112 for imaging a target 130 on to a sensor 114. The lens 112 can be a simple lens or the equivalent lens for a more complex imaging system. The sensor 114 can be, for example, a charge-coupled device (CCD) or a complementary metal-oxide-semiconductor (CMOS) device. The imaging system 110 can be an independent system, such as a digital camera, or part of another device. In one configuration, the imaging system 110 can be part of a mobile device, such as a smartphone.

Figure 4A:
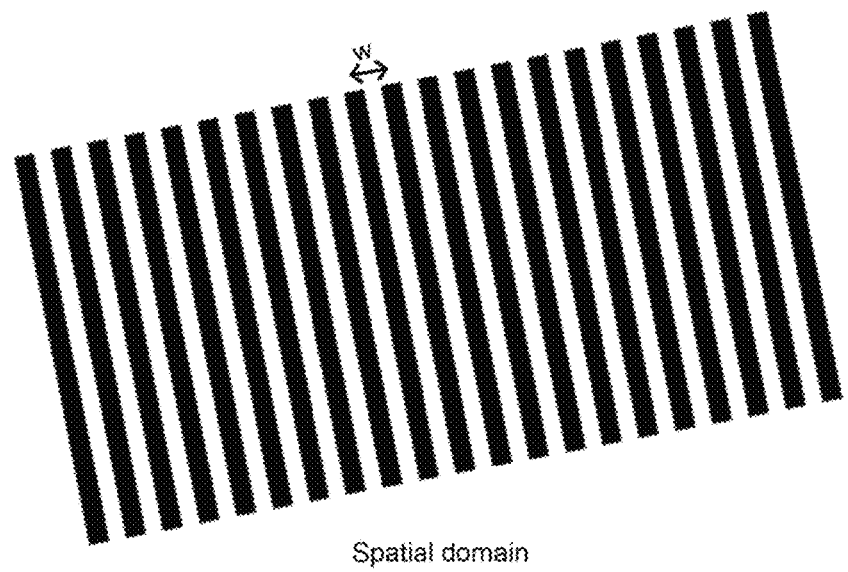
FIG. 4A depicts an example one-dimensional periodic target in the spatial domain.

For the computing system 120 to perform range finding and autofocusing, the imaging system 110 should image a target 130 that is either periodic or quasi-periodic. A periodic target is made up of elements that occur at regular intervals. An example of a one-dimensional periodic target in the form of parallel lines is shown in FIG. 4A.

Figure 5A:
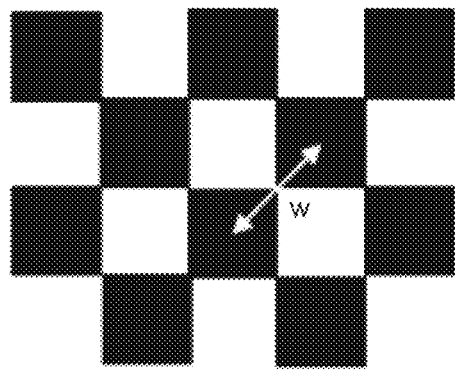
FIG. 5A depicts an example of a two-dimensional periodic clustered-dot halftone structure from which a stegatone is based.
Figure 6A:
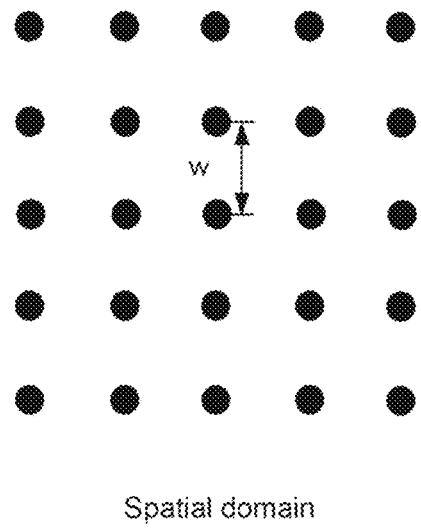
FIG. 6A depicts an example of a two-dimensional periodic dot structure from which a grid code is based.

A quasi-periodic target is made up of elements that have been perturbed slightly from a center point, and the center points make up a periodic pattern. A quasi-periodic target can be used to represent data. A quasi-periodic two-dimensional object may be a semi-steganographic halftone ("stegatone") or grid code that consists of an array of elements on a two-dimensional periodic structure, where data elements are represented with small perturbations in the periodic structure. An example of a two-dimensional periodic clustered-dot halftone structure from which a stegatone is based is shown in FIG. 5A, and an example of a two-dimensional periodic dot structure from which a grid code is based is shown in FIG. 6A.

Figure 2:
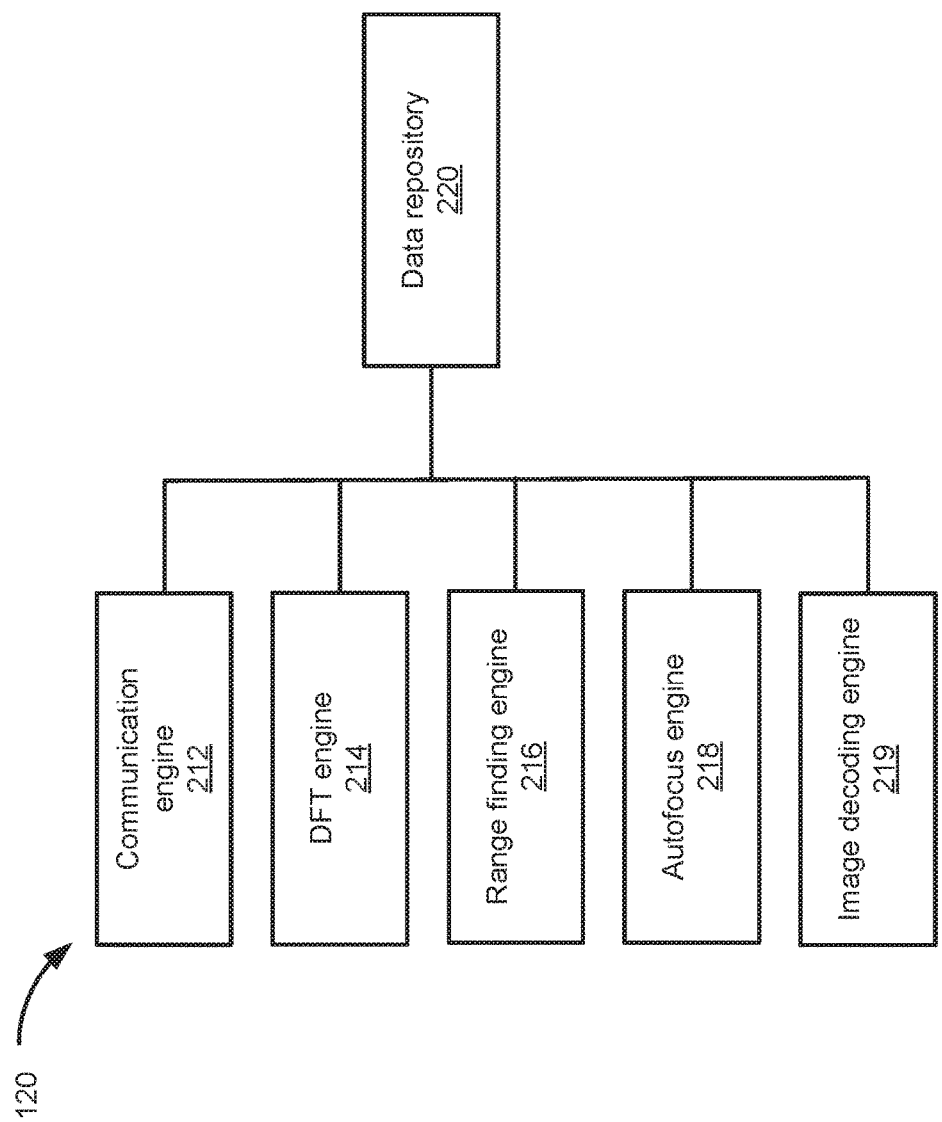
FIG. 2 depicts a block diagram of an example computing system.
Figure 3:
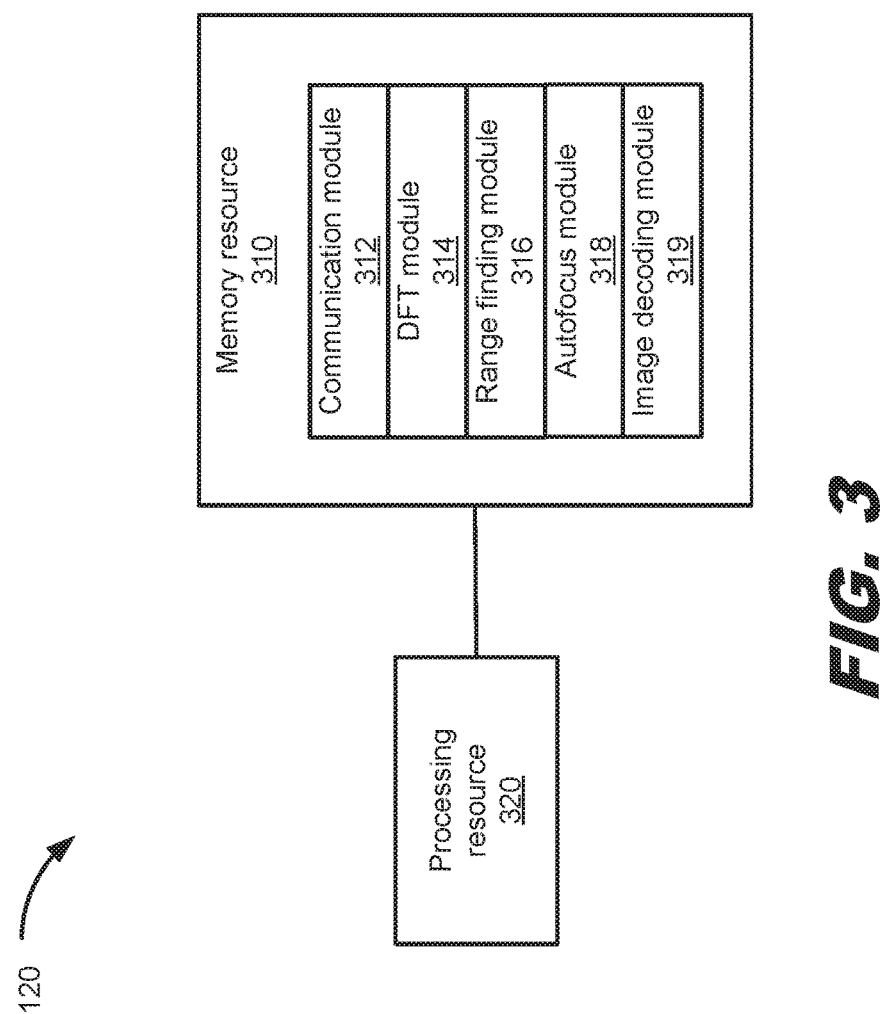
FIG. 3 depicts a block diagram depicting an example memory resource and an example processing resource.

FIGS. 2 and 3 depict examples of physical and logical components for implementing the computing system 120. In the example of example of FIG. 2, various components are identified as engines 212, 214, 216, 218, 219. The descriptions of engines 212, 214, 216, 218, 219 will focus on each engine's designated function. However, the term engine refers to a combination of hardware and programming configured to perform a designated function. As illustrated with respect to FIG. 3, the hardware of each engine, for example, may include a processor and a memory, while the programming is software code stored on that memory and executable by the processor to perform the designated function.

FIG. 2 depicts a block diagram of the example computing system 120. Computing system 120 can include a communication engine 212, a discrete Fourier transform (DFT) engine 214, a range finding engine 216, an autofocus engine 218, and an image decoding engine 219. Each of the engines 212, 214, 216, 218, 219 can interact with the data repository 220.

Communication engine 212 may be configured to receive signals to trigger the capture of an image of a target with a sensor, or to receive a captured image of a target for analysis. Communication engine 212 may also be configured to report a determined range distance between the target and a lens that captures an image of the target. Additionally, communication engine 212 may be configured to report a determined autofocus distance between the, lens and a sensor, or to adjust the distance between the lens and the sensor by sending signals to move the lens and/or the sensor. Reporting can be performed by the communication engine 212 by sending the values of the determined distance by any of a variety of methods, for example, immediately reporting values upon determination, sending a report at a predetermined time, or sending the values by email to a receiver.

DFT engine 214 is configured to take a discrete Fourier transform of an image of a target. The magnitude plot of the DFT of the image shows the frequency content of the image with different values at different frequencies. Strong spikes or peaks in the DFT may correspond to the spatial frequency of a periodic or quasi-periodic structure of the target. A half-plane of the magnitude plot of the DFT is analyzed by the DFT engine 214 to identify the peak points in a local neighborhood, and peak points in the other half-plane are assumed based on peak points within the analyzed half-plane. Then the distances between each identified peak point and the origin point in the frequency domain are determined. These distances are referred to herein as peak distances. Range finding engine 216 is configured to find a range distance between the target and the lens of the imaging system. An exact distance can be determined based on the determined peak distances; parameters of the imaging system, for example, the size of the image sensor and the focal length of the lens; and parameters of the target, for example, the print resolution of the target and the fundamental spatial resolution of the target If the parameters of the imaging system are not known, an empirically determined ratio of the lens-to-target distance to a target extent can be used, where the measured ratio is for a sample lens-to-target distance within an operating range of the imaging system. Then an approximate range distance can be found based on the peak distances, the empirically measured ratio, and the parameters of the target. Details for finding the exact and, approximate range distances are provided below.

Autofocus engine 218 is configured to find an autofocus distance between the lens and the sensor that autofocuses the imaging system. An exact autofocus distance can be determined based on the peak distances, the parameters of the imaging system, and the parameters of the target. In some implementations, the autofocus engine 218 can control the position of the lens and/or the sensor of the imaging system to adjust the distance between the elements to the determined autofocus distance. Details for finding the autofocus distance are provided below.

In some implementations, the image decoding engine 219 is configured to recover data from the image of a quasi-periodic target, wherein the data is represented with a known method in the target.

Data repository 220 can store data, such as peak distances, empirically determined ratios of the lens-to-target distance and a target extent, parameters of imaging systems, and parameters of targets.

In the above description, various components were described as combinations of hardware and programming. Such components may be implemented in different ways. Referring to FIG. 3, the programming may be processor executable instructions stored on tangible memory resource 310 and the hardware may include processing resource 320 for executing those instructions. Thus, memory resource 310 can store program instructions that when executed by processing resource 320, implements computing system 120 of FIG. 2.

Memory resource 310 generally represents any number of memory components capable of storing instructions that can be executed by processing resource 320. Memory resource 310 is non-transitory in the sense that it does not encompass a transitory signal but instead is made up of one or more memory components configured to store the relevant instructions. Memory resource 310 may be implemented in a single device or distributed across devices. Likewise, processing resource 320 represents any number of processors capable of executing instructions stored by memory resource 310. Processing resource 320 may be integrated in a single device or distributed across devices. Further, memory resource 310 may be fully or partially integrated in the same device as processing resource 320, or it may be separate but accessible to that device and processing resource 320.

In one example, the program instructions can be part of an installation package that when installed can be executed by processing resource 320 to implement system 120. In this case, memory resource 310 may be a portable medium such as a compact disc (CD), digital video disc (DVD), or flash drive or a memory maintained by a server from which the installation package can be downloaded and installed. In another example, the program instructions may be part of an application or applications already installed. Memory resource 310 can include integrated memory, such as a hard drive, solid state drive, or the like.

In the example of FIG. 3, the executable program instructions stored in memory resource 310 are depicted as communication module 312, DFT module 314, range finding module 316, autofocus module 318, and image decoding module 319. Communication module 312 represents program instructions that when executed cause processing resource 320 to implement communication engine 212. DFT module 314 represents program instructions that when executed cause processing resource 320 to implement DFT engine 214. Range finding module 316 represents program instructions that when executed cause processing resource 320 to implement range finding engine 216. Autofocus module 318 represents program instructions that when executed cause processing resource 320 to implement autofocus engine 218. Image decoding module 319 represents program instructions that when executed cause processing resource 320 to implement image decoding engine 219.

Figure 4B:
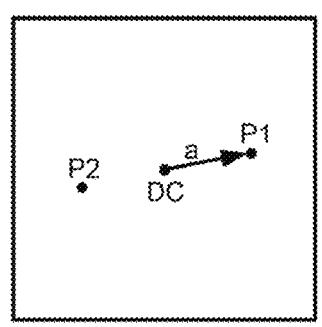
FIG. 4B depicts locations of peaks of the magnitude of a Fourier transform of the example one-dimensional periodic target.
Figure 5B:
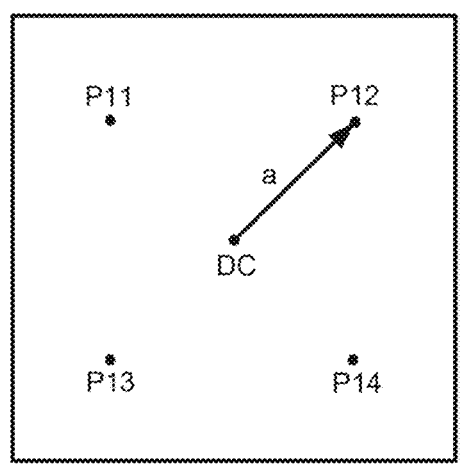
FIG. 5B depicts locations of peaks of the magnitude of a Fourier transform of the example two-dimensional periodic target.
Figure 6B:
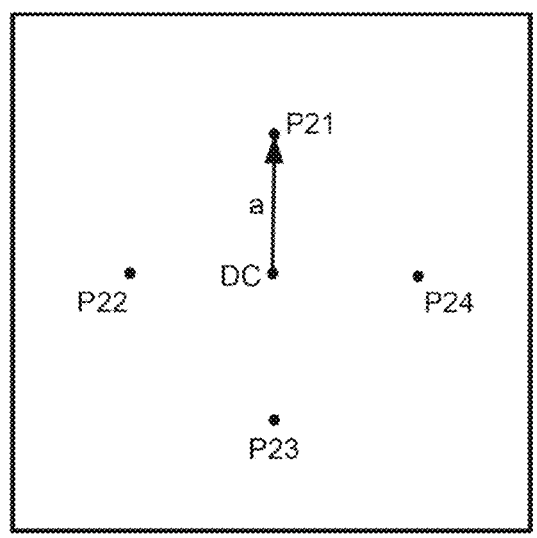
FIG. 6B depicts locations of peaks of the magnitude of a Fourier transform of the example two-dimensional periodic target.

The techniques described below for finding the range distance and the autofocus distance are applicable to both near field and far field periodic and quasi-periodic targets. With both near field and far field range finding, the imaging system should have sufficient resolution to discriminate the periodic or quasi-periodic elements of the target and also be able to capture the entire target in the image, or a sufficiently large portion of the target so that the magnitude of the DFT of the image has discernible dominant peaks, where the peaks arise from the periodic spatial patterns of the target. When the target is in the field of view of the imaging system, the dominant peaks will appear in the magnitude of the DFT, as shown in the examples of FIG. 4B which depicts locations of peaks of the example one-dimensional target shown in FIG. 4A; FIG. 5B which depicts locations of peaks of the example two-dimensional periodic target shown in FIG. 5A; and FIG. 6B which depicts locations of peaks of the example two-dimensional periodic grid-code target shown in FIG. 6A. In the case of a one-dimensional target, there will be a total of two peaks in the DFT magnitude image, one in each half-plane, P1, P2, as seen in the example of FIG. 4B. In the case of a two-dimensional target, there will be a total of four peaks in the DFT magnitude image, two in each half-plane. Peaks P11, P12, P13, P14 are seen in the example of FIG. 5B, and peaks P21, P22, P23, P24 are seen in the example of FIG. 6B. The peak points in a first half-plane of the DFT magnitude image are reflections through the origin point in the frequency domain of the peak points in the other half-plane. Thus, it is sufficient to determine the peak points in one half-plane.

The peak distance, a, between a peak point and the origin has a fixed relationship to other system variables, as given by the equation: $a=P/(Cw)$, where P is the print resolution in printed-pixels per inch, w is the fundamental spatial period in printed-pixels per cycle, C is the capture resolution in captured-pixels per inch, and a has units of cycles/captured pixel. If the target is perpendicular to the optical axis of the imaging system, all of the peaks will be equidistant from the origin point of the frequency domain. If the target is oblique to the optical axis of the imaging system, the peak distances of the points will vary, and an average of the peak distances can be used for a, or a can be obtained using any other suitable function based upon the determined peak distances.

For a clustered-dot halftone, the fundamental or highest periodic frequency w is defined by the halftone "screen line" period, as shown in the example of FIG. 5A which shows a 45-degree clustered dot screen. For an example stegatone cell size of 4, the value of w is $4\sqrt{2}$, and for an example print resolution P of 400, the peak distance a is $100/(C\sqrt{2})$ cycles/pixel.

The fundamental spatial period w for an example grid code is shown in FIG. 6A. Note that the targets shown in FIGS. 5A and 6A are rotated 45 degrees with respect to each other. In general, the peak distance is independent of the angle of rotation of a target. For an example case where w is 10, and P is 812.8, the peak distance a is 81.28/C cycles/pixel.

Figure 7:
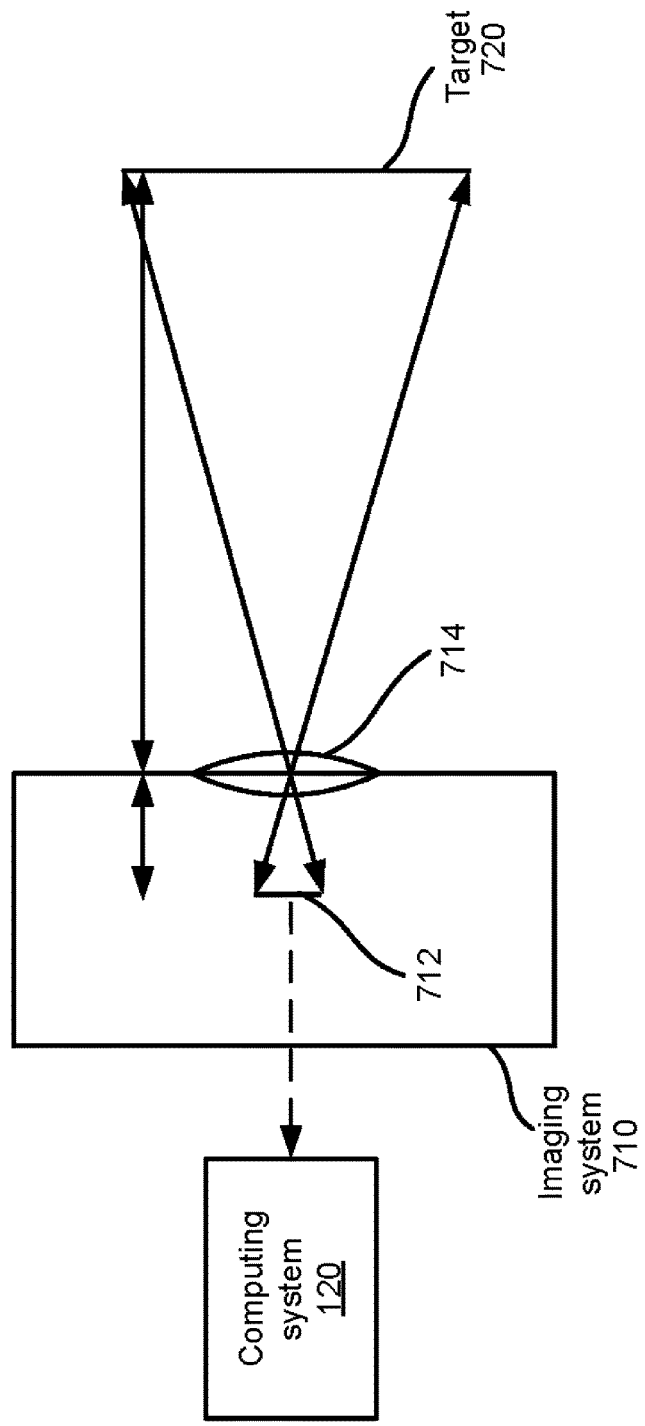
FIG. 7 depicts an example optical imaging system communicates imaging data to a computing system.

In some cases, the image of a target can be captured using a mobile device camera, and the image can be analyzed using a processor on the mobile device. A typical smartphone has both components. Optical imaging systems of mobile device cameras can be modeled as a thin lens system, as shown in the example of FIG. 7. The imaging system 710 includes a thin lens 714 that images the target 720 onto a sensor 712. The image captured by the sensor 712 is sent to the computing system 120 for processing to determine a range distance and/or an autofocus distance. For ease of description, the following variables are used: T is the span of the captured target; S is the size of the image sensor that spans N pixels; g is the distance between the lens 714 and the sensor 712, also known as the focal distance; d is the range distance between the lens 714 and the target 720; and f is the focal length of the lens 714. Additionally, N is the number of capture samples that span the captured target, that is, the size of the calculated DFT. For a larger value of N, a better resolution is obtained for the calculated distance. However, the computation time for obtaining the distance is longer.

Based on the thin lens equation, $1/d+1/g=1/f$, an exact expression for the range distance d is given by:

$$d=[1+wNa/(SP)]f. \qquad (1)$$

In some cases, the values for the focal length f of the lens 714 and the size S of the sensor 712 are not known. However, a ratio of similar triangles given by the relationship $d/T=g/S$ remains nearly constant over the range of distances that are of interest, that is, where there is sufficient resolution to resolve the elements of the target and where at least most of the target is captured by the imaging system. The size of the image sensor S is constant, and the focal distance g vanes slightly. For mobile device cameras, the variation of the focal distance g is within 2% over the range of interest. Thus, an approximation $d/T \approx R$ can be used, where the dimensionless ratio R is determined empirically for a sample distance within the range of interest. Then the approximate range distance is given by:

$$d=aRwN/P, \qquad (2)$$

where the peak distance a is a non-constant value, and the values for R, w, N and P are known.

In cases where the focal distance g of the imaging system 710 can be controlled, for example, by moving the position of the imaging lens 714 and/or the position of the sensor 712, the focal distance g for fine tuning the system can be determined, By using the thin lens equation, the exact expression for focal distance g is given by:

$$g=[1+SP/(wNa)]f, \qquad (3)$$

where the sensor size S and the focal length f are used. Typically, the value of the focal distance g is very sensitive, so using the empirically determined ratio R may not provide sufficiently accurate results for the focal distance.

Figure 8A:
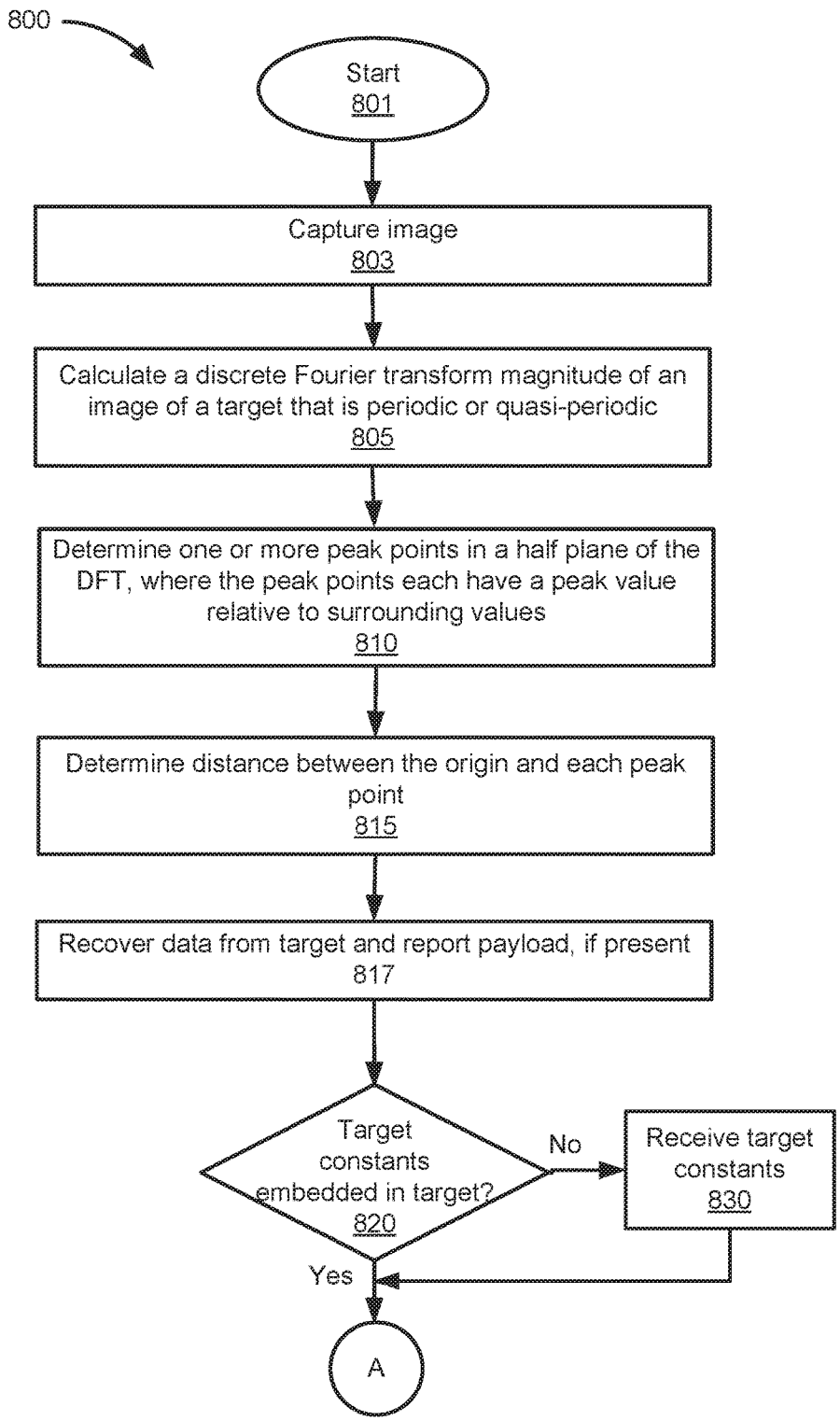
FIGS. 8A-8C depict a flow diagram illustrating an example process of finding a range distance to a target and/or an autofocus distance for the target imaging system
Figure 8B:
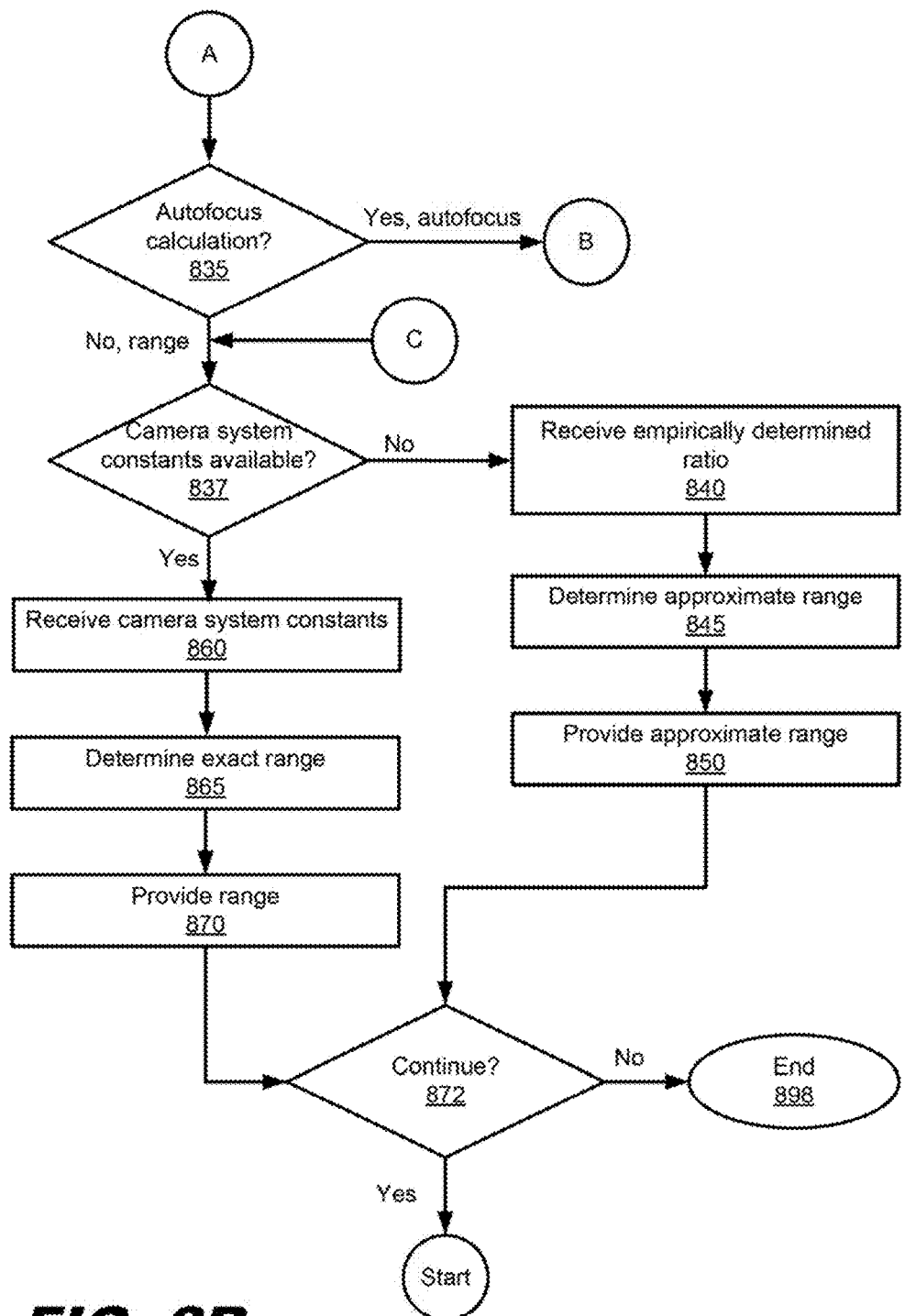
Figure 8C:
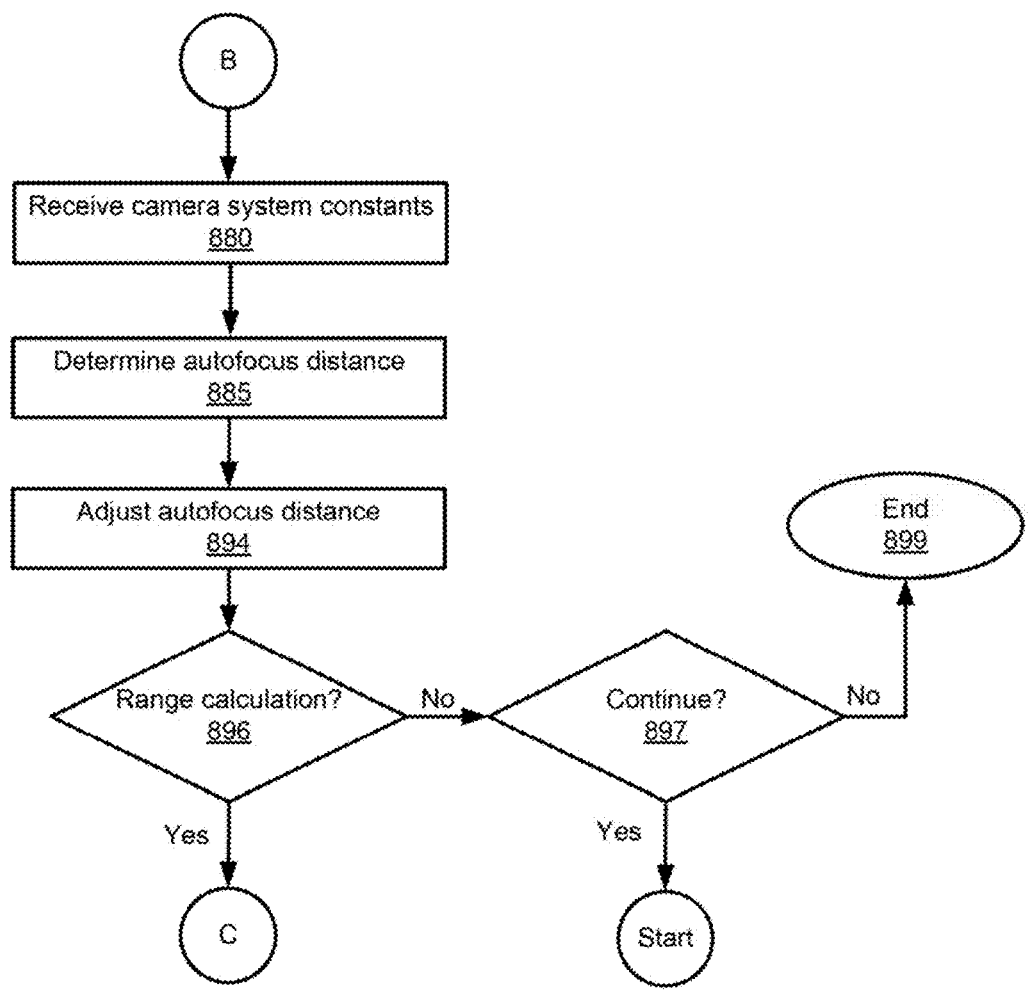

FIGS. 8A-8C depict a flow diagram illustrating an example process 800 for finding a range distance to a target and/or an autofocus distance for the target imaging system. The process starts at block 801, and at block 803, the imaging system captures an image of the target Next, at block 805, the computing system calculates a discrete Fourier transform magnitude of an image of a target that is periodic or quasi-periodic. The computing system uses a pre-established value N for computing the DFT.

Then at block 810, the computing system determines the locations of one or more peak points in a half-plane of the magnitude DFT, where the peak points each have a peak value relative to surrounding values. When the origin of the magnitude DFT is blocked, the peak points are global maxima. The peak points in the other half-plane are reflections through the origin of the peak points in the first half-plane. Next, at block 815, the computing system determines the distance between the origin in the frequency domain and each peak point.

Then at block 817, the computing system recovers data from the image of the target and reports the payload, if one is present. If payload data is present, it can have two parts. There can be a general payload which can be any kind of useful data, such as a link. Alternatively or additionally, the payload can include target constants specifically intended for the range finder.

At decision block 820, a decision is made by the computing system as to whether the target constants, the print resolution P and the fundamental spatial resolution w, are embedded as data in the target as a payload. In some cases, the computing system can be provided the target constants so that there is no need to obtain the information from the target. In some cases, the computing system may be directed to decode the target from the captured image to acquire the target constants.

If the target constants are not embedded in the target (block 820—No), at block 830, the computing system receives the target constants. The target constants can be received from a user or other system, for example, the target constants may be in a data file associated with the target. The process continues to decision block 835, If the target constants are embedded in the target (block 820—Yes), the process continues directly to decision block 835.

At decision block 835, the computing system determines whether an autofocus calculation should be performed. If an autofocus calculation is not to be performed (block 835—No, range), the system will perform a range calculation, and at decision block 837, the computing system determines whether the camera system constants, sensor size S and focal length f, are available. If the camera system constants are available (block 837—Yes), at block 860, the computing system receives the camera system constants. In some implementations, a pre-established library of imaging system constants for mobile device imaging systems can be stored. Then at block 860, the computing system can retrieve the appropriate constants for the particular imaging system for which the range distance is to be determined.

Then at block 865, the computing system determines the exact range distance using equation (1) given above and the peak distances determined at block 815. Next, at block 870, the computing system provides the calculated range distance as an output, for example, the range distance can be caused to be displayed, or can be sent as a report to another device.

At decision block 872, the computing system determines whether the process should be continued. The range and autofocus distance determination process can be run in a continuous loop as the camera system moves. If the process should be continued (block 872—Yes), the process returns to start block 801. If the process should not be continued (block 872—No), the process ends at block 898.

Returning to decision block 837, if the camera constants are not known (block 837—No), at block 840, the computing system receives an empirically determined ratio R using a sample target-to-imaging-lens distance to target span. Then at block 845, the computing system determines the approximate range distance using equation (2) given above and the peak distances determined at block 815. And at block 850, the computing system provides the approximate range distance as an output, for example, the approximate range distance can be caused to be displayed, or can be sent as a report to another device. The process continues to decision block 872.

Returning to decision block 835, if an autofocus calculation is to be performed (block 835—Yes, autofocus), at block 880, the computing system receives the imaging constants, S and f. In some cases, a pre-established library of imaging system constants for mobile device cameras or smartphones can be stored. Then at block 880, the computing system can retrieve the appropriate constants for the particular imaging system to be autofocused. Then at block 885, the computing system uses equation (3) given above and the peak distances determined at block 815 to determine the exact autofocus distance.

Next, at block 894, the computing system adjusts the autofocus distance by either moving the position of the lens or lenses in the camera system and/or the position of the sensor, and the process proceeds to decision block 896.

Then at decision block 896, the computing system determines whether a range calculation should be performed. If a range calculation should be performed (block 896—Yes), the process returns to decision block 837. If a range calculation does not need to be performed (block 896—No), at decision block 897, the computing system determines whether the process should continue. If the process should continue (block 897—Yes), the process returns to start block 801. If the process should not continue (block 897—No), the process ends at block 899.

When the target includes embedded data, such as with a stegatone or grid code, the smartphone or other system having an imaging, system and a processor can perform data recovery in addition to finding the range distance and/or the autofocus distance.

What is claimed is:

1. A method comprising:
   determining one or more peak points in a half-plane of a discrete Fourier transform magnitude of an image of a target, wherein the one or more peak points each have a peak value relative to surrounding values, and further wherein the target is periodic or quasi-periodic, and further wherein a lens images the target on a sensor that captures the image;
   based on a peak distance between an origin point in a frequency domain and each of the one or more peak points that are determined, determining a range distance between the target and the lens;
   providing the range distance as a first output;
   obtaining data from the image, wherein the obtained data includes a print resolution of the target and a fundamental spatial resolution of the target; and
   receiving an empirically measured ratio of a lens-to-target distance and a target extent, wherein the empirically measured ratio is for a sample lens-to-target distance within an operating range of a system comprising the lens and the sensor, wherein the range distance is further based on the print resolution, the fundamental spatial resolution, and the empirically measured ratio.

2. The method of claim 1, wherein the data that is obtained is recovered from the image and further comprising:
   receiving a sensor size and a focal length of the lens, wherein the range distance is further based on the print resolution, the fundamental spatial resolution, the sensor size, and the focal length.

3. The method of claim 1, further comprising:
   receiving values for a sensor size and a focal length of the lens, wherein the range distance is further based on the print resolution, the fundamental spatial resolution, the sensor size, and the focal length.

4. The method of claim 1, further comprising:
   based on the peak distance of each of the one or more peak points that are determined, determining an autofocus distance between the lens and the sensor; and
   providing the autofocus distance as a second output, or adjusting a distance between the lens and the sensor to the autofocus distance.

5. The method of claim 4, further comprising:
   receiving a sensor size and a focal length of the lens, wherein the autofocus distance is further based on the print resolution, the fundamental spatial resolution, the sensor size, and the focal length.

6. A method comprising:
   determining one or more peak points in a half-plane of a discrete Fourier transform magnitude of an image of a target, wherein the one or more peak points each have a peak value relative to surrounding values, and further wherein the target is periodic or quasi-periodic, and further wherein a lens images the target on a sensor that captures the image;
   based on a peak distance between an origin point in a frequency domain and each of the one or more peak points that are determined, determining a range distance between the target and the lens;
   providing the range distance as a first output;
   receiving values for a print resolution of the target and a fundamental spatial resolution of the target; and
   receiving an empirically measured ratio of a lens-to-target distance and a target extent, wherein the empirically measured ratio is for a sample lens-to-target distance within an operating range of a system comprising the lens and the sensor, wherein the range distance is further based on the print resolution, the fundamental spatial resolution, and the empirically measured ratio, and further wherein the range distance is an approximation.

7. A system comprising:
   a lens to image a target on a sensor, wherein the target is periodic or quasi-periodic;
   the sensor to capture an image of the target; and
   a processor to:

identify one or more peak points in a half-plane of a discrete Fourier transform magnitude of the image, wherein each of the one or more peak points have a greater value relative to neighboring values;

based on a peak distance between an origin point in a frequency domain and each of the one or more peak points that are determined, determine an autofocus distance between the lens and the sensor;

based on the autofocus distance, adjust a distance between the lens and the sensor to autofocus the system;

based on the peak distance for each of the one or more peak points that are determined, determine a range distance between the target and the lens;

provide the range distance as an output;

obtain data from the image, wherein the obtained data includes a print resolution of the target and a fundamental spatial resolution of the target; and receive an empirically measured ratio of a lens-to-target distance and a target extent, wherein the empirically measured ratio is for a sample lens-to-target distance within an operating range of a system comprising the lens and the sensor, wherein the range distance is further based on the print resolution, the fundamental spatial resolution, and the empirically measured ratio.

8. The system of claim 7, wherein the processor is further to:

receive a sensor size and a focal length of the lens, wherein the autofocus distance is further based on the print resolution, the fundamental spatial resolution, the sensor size, and the focal length.

* * * * *

UNITED STATES PATENT AND TRADEMARK OFFICE
CERTIFICATE OF CORRECTION

PATENT NO. : 10,171,723 B2
APPLICATION NO. : 15/327290
DATED : January 1, 2019
INVENTOR(S) : Robert Ulichney et al.

Page 1 of 1

It is certified that error appears in the above-identified patent and that said Letters Patent is hereby corrected as shown below:

On the Title Page

Item (57), Column 2, ABSTRACT, Line 2, delete "origin," and insert -- origin --, therefor.

Signed and Sealed this
Sixteenth Day of April, 2019

Andrei Iancu
*Director of the United States Patent and Trademark Office*